(12) United States Patent
Hill

(10) Patent No.: US 7,850,176 B2
(45) Date of Patent: Dec. 14, 2010

(54) METHOD AND APPARATUS FOR DUAL LEVER WHEELBARROW

(76) Inventor: William Steven Hill, 2030 Seventh Ave., Apt 313, Seattle, WA (US) 98121

( * ) Notice: Subject to any disclaimer, the term of this patent is extended or adjusted under 35 U.S.C. 154(b) by 619 days.

(21) Appl. No.: 11/381,732

(22) Filed: May 4, 2006

(65) Prior Publication Data

US 2006/0250020 A1     Nov. 9, 2006

Related U.S. Application Data

(60) Provisional application No. 60/678,706, filed on May 9, 2005.

(51) Int. Cl.
*B62B 1/00* (2006.01)
(52) U.S. Cl. ............. 280/47.31; 280/653; 280/659
(58) Field of Classification Search ............ 280/47.31, 280/47.32, 47.18, 47.33, 47.12, 47.26, 659 280/610, 855
See application file for complete search history.

(56) References Cited

U.S. PATENT DOCUMENTS

| | | | | | |
|---|---|---|---|---|---|
| 1,325,557 | A | * | 12/1919 | Cummins | 280/47.31 |
| 1,526,935 | A | * | 2/1925 | Roemer | 280/47.31 |
| 1,578,213 | A | * | 3/1926 | Smith | 280/47.31 |
| 1,622,354 | A | * | 3/1927 | Smith | 280/47.31 |
| 1,630,975 | A | * | 5/1927 | Smith | 280/47.31 |
| 1,648,374 | A | * | 11/1927 | Littleton | 280/855 |
| 1,804,403 | A | * | 5/1931 | Dowling | 280/47.12 |
| 2,247,083 | A | * | 6/1941 | Garlinghouse | 280/47.12 |
| 2,553,334 | A | * | 5/1951 | Schmidt | 280/47.31 |
| 2,767,886 | A | * | 10/1956 | Jenkins | 222/610 |
| 2,852,304 | A | * | 9/1958 | Harrison | 280/47.31 |
| 3,170,707 | A | * | 2/1965 | Millar, Jr. et al. | 280/47.31 |
| 3,199,891 | A | * | 8/1965 | Grable et al. | 280/47.31 |
| 3,235,281 | A | * | 2/1966 | Faucette, Jr. | 280/47.31 |
| 3,282,600 | A | * | 11/1966 | Tonelli | 280/47.31 |
| 3,404,427 | A | * | 10/1968 | Mack | 16/427 |
| 4,789,171 | A | * | 12/1988 | Porter | 280/47.18 |
| 4,854,601 | A | * | 8/1989 | Herndon | 280/47.31 |
| 4,955,625 | A | * | 9/1990 | Herndon | 280/47.31 |
| 5,121,970 | A | * | 6/1992 | Andersen | 280/47.31 |
| 5,149,116 | A | * | 9/1992 | Donze et al. | 280/47.26 |
| 5,794,307 | A | * | 8/1998 | Overcash et al. | 280/47.31 |
| 5,878,827 | A | * | 3/1999 | Fox | 280/47.31 |
| 6,241,276 | B1 | * | 6/2001 | Wilburn | 280/659 |
| 6,390,496 | B1 | * | 5/2002 | Eicher | 280/653 |
| 6,554,301 | B2 | * | 4/2003 | Scott et al. | 280/47.31 |
| 6,964,421 | B2 | * | 11/2005 | Friel | 280/47.31 |
| 7,000,929 | B1 | * | 2/2006 | Liu | 280/47.31 |
| 7,134,676 | B2 | * | 11/2006 | Capers et al. | 280/47.31 |
| 7,296,807 | B2 | * | 11/2007 | Zimmerman | 280/47.32 |

* cited by examiner

*Primary Examiner*—Hau V Phan
(74) *Attorney, Agent, or Firm*—D. A. Nissen

(57) ABSTRACT

A wheelbarrow including a first lever providing at least one handle rigidly coupled to a second lever providing a bucket for carrying a payload. A lever assembly rigidly coupled to the second lever.

3 Claims, 5 Drawing Sheets

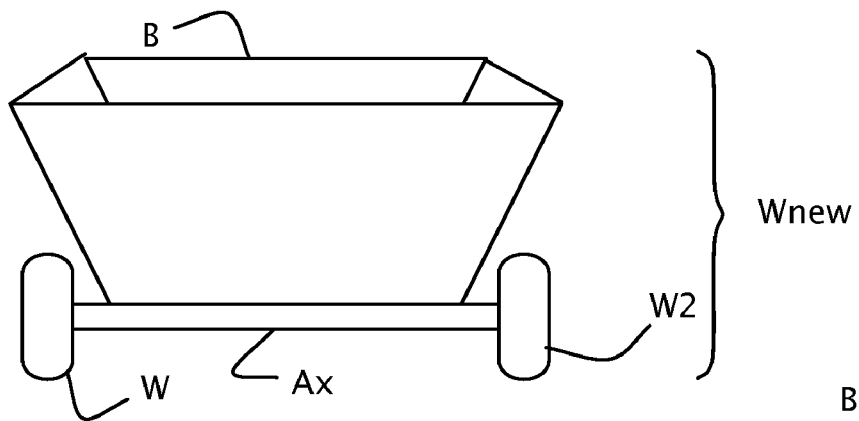
Fig. 4A
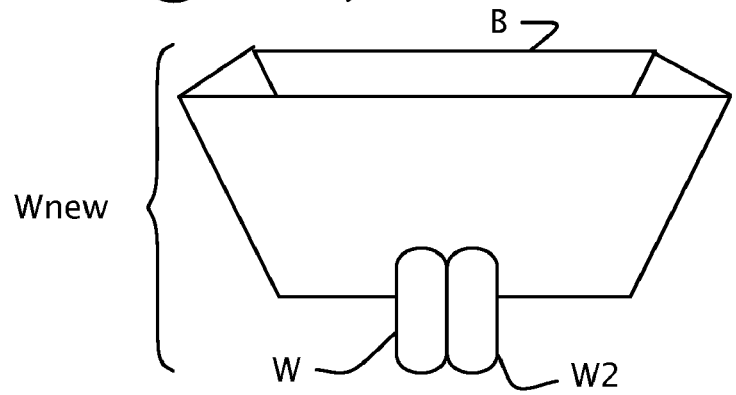
Fig. 4B
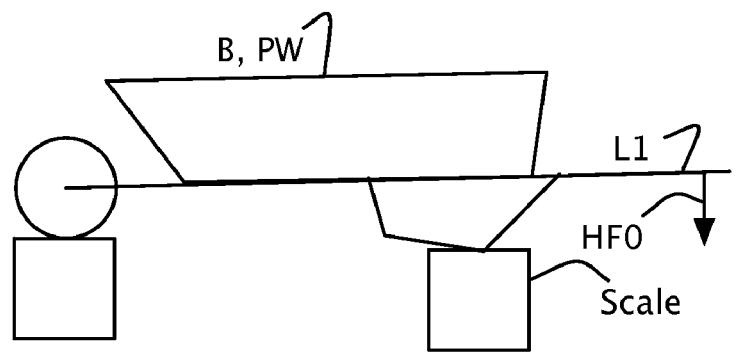
Fig. 4C
Prior Art
Fig. 4D
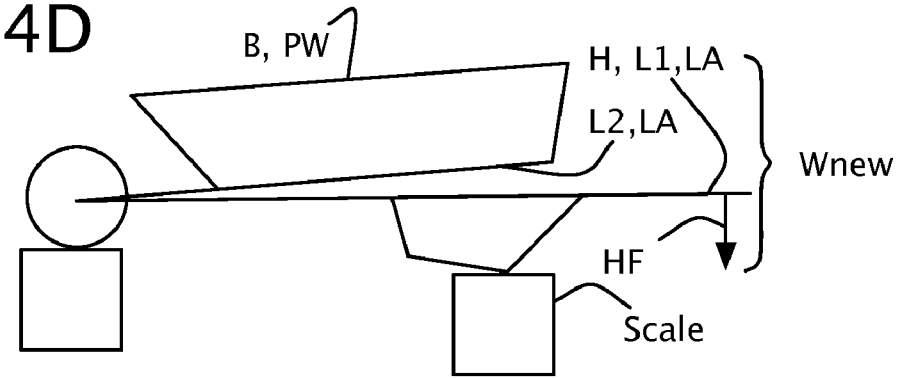

METHOD AND APPARATUS FOR DUAL LEVER WHEELBARROW

CROSS REFERENCE TO RELATED PATENT APPLICATIONS

This application claims priority to provisional application Ser. No. 60/678,706, filed May 9, 2005 and entitled "Levered load wheel barrow".

TECHNICAL FIELD

This invention relates to wheelbarrows, in particular, to wheelbarrows having handles provided by a first lever rigidly coupled to a second lever supporting a payload.

BACKGROUND OF THE INVENTION

Contemporary wheelbarrows typically include a first lever providing at least one handle and a bucket, mounted upon at least one wheel. They are possibly the oldest wheeled machine in the world and haven't changed much in quite a long time.

The inventor found a problem where others saw a situation, namely, the lifting ratio for the wheelbarrow was inherently limited because the handles need to be close to the rest of the unit to maintain the maneuverability. He realized there was a way to achieve the equivalent of a long lever arm for a wheelbarrow, while maintaining its compact and maneuverable qualities.

SUMMARY OF THE INVENTION

The invention's wheelbarrow includes a first lever providing at least one handle and rigidly coupled to a second lever providing a bucket for carrying a payload. The use of two rigidly coupled levers provides an improved lifting ratio between the force applied at the handle to lift a payload weight in the bucket when compared with traditional single lever wheelbarrows. This improved lifting ratio cannot be achieved with traditional, single lever wheelbarrows without making the handles prohibitively long, rendering them too awkward for normal use.

The first lever may further provide a second handle.

Certain preferred embodiments of the wheelbarrow use a lever assembly including the first lever for providing at least one handle and rigidly coupled to the second lever for providing a bucket for a payload. When constructed this way, the wheelbarrow includes the lever assembly providing the at least one handle and the bucket and the lever assembly mounted on at least one wheel. The first lever further provides the at least one handle, and the second lever further provides the bucket.

The lever assembly may further be mounted on at least two wheels.

The wheel or wheels may be mounted to at least one of the first lever, the second lever and/or a joint coupled between the first lever and the second lever.

Manufacturing the wheelbarrow may include coupling the lever assembly to the bucket to create the second lever providing the bucket, and mounting the lever assembly to the at least one wheel to create the lever assembly mounted to the wheel. Manufacturing the wheelbarrow may includes coupling the first lever to the second lever to create the lever assembly, coupling the bucket to the second lever, and mounting the at least one wheel to the lever assembly to create the wheelbarrow.

The invention includes a wheelbarrow kit for making the wheelbarrow, including the at least one wheel, the bucket, the first lever and the second lever.

The invention includes the wheelbarrow as a product of any of these manufacturing processes.

The invention includes a lever assembly kit including the first lever and the second lever, and manufacturing the lever assembly by rigidly coupling the first lever to the second lever to create the lever assembly.

Alternatively, manufacturing the lever assembly may include forming the first lever rigidly coupled to the second lever to create the lever assembly. The step of forming may further include forming the first lever rigidly coupled to the second lever providing the bucket to create the lever assembly.

The invention includes the lever assembly as a product of any of these manufacturing processes.

BRIEF DESCRIPTION OF THE DRAWINGS

FIGS. 1B to 4B show various embodiments and details of the invention's wheelbarrow;

FIG. 4C shows a prior art wheelbarrow in the experimental set described herein;

FIG. 4D shows an embodiment of the invention's wheelbarrow in the experimental setup;

DETAILED DESCRIPTION

This invention relates to wheelbarrows, in particular, to wheelbarrows having handles provided by a first lever rigidly coupled to a second lever supporting a payload.

The invention's wheelbarrow Wnew includes a first lever L1 providing at least one handle H and rigidly coupled to a second lever L2 providing a bucket B for carrying a payload, as shown in FIGS. 1B to 4B, 4D, 5A and 5C.

Figure 1A:
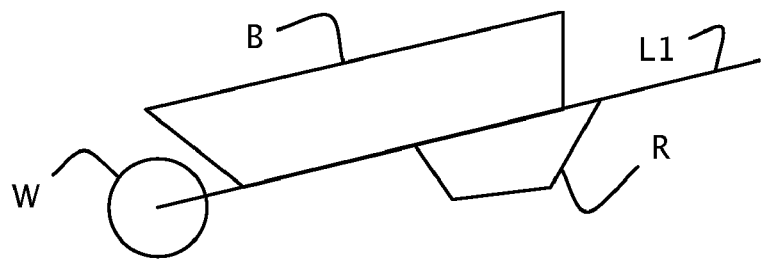
FIG. 1A shows a prior art wheelbarrow.
Figure 1B:
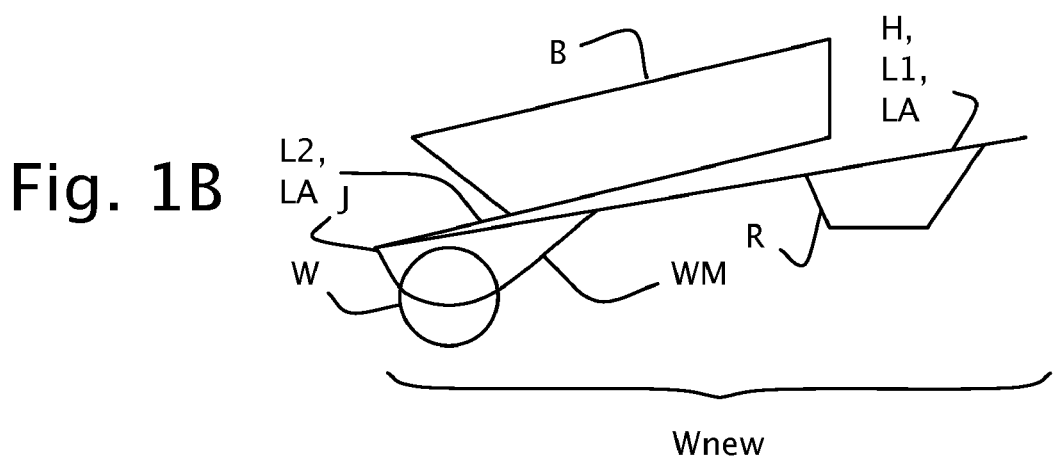
Figure 1C:
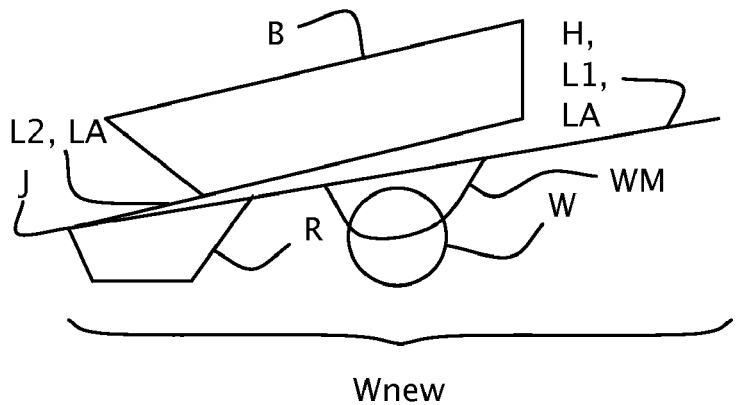
Figure 1D:
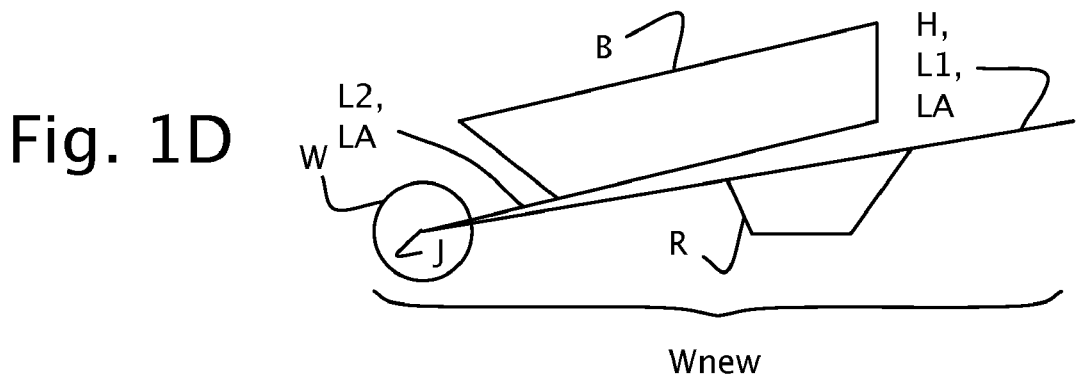
Figure 2A:
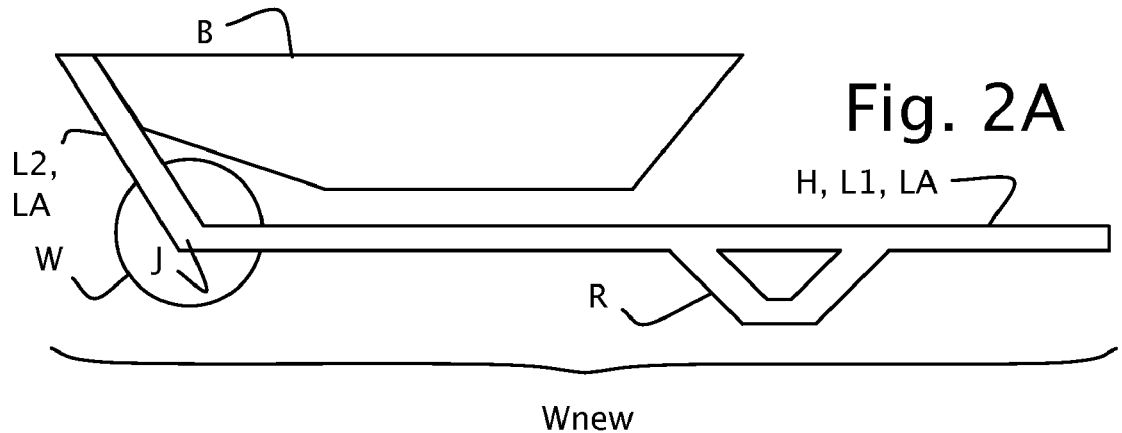
Figure 2B:
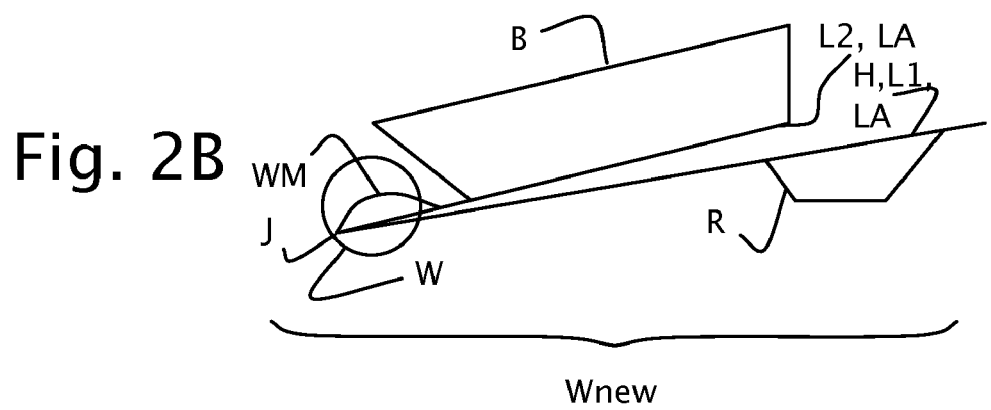
Figure 2C:
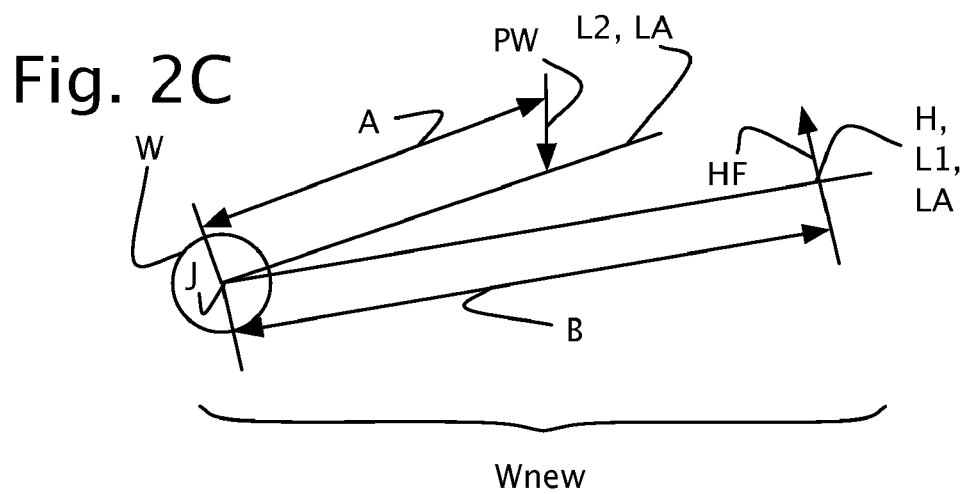

The use of the two rigidly coupled levers provides an improved lifting ratio between the force applied at the handle to lift a payload weight in the bucket when compared with traditional single lever wheelbarrows. This improved lifting ratio cannot be achieved with traditional, single lever wheelbarrows with making the handles prohibitively long, rendering them too awkward for normal use. In an experiment by the inventor, two wheelbarrows with similar first lever L1, wheel W, rest R and bucket B, were placed on a block to measure their handle force for the same payload weight PW. FIG. 4C shows the experimental setup for the prior art wheelbarrow with a handle force HF0 and FIG. 4D shows the setup for the invention's wheelbarrow Wnew with a handle force HF. The scale in each case was adjusted to compensate for the empty weight of the wheelbarrow. The prior art wheelbarrow showed the prior art handle force essentially the same as the payload weight. The handle force of the invention's wheelbarrow showed one third the payload weight, showing an improvement in the lifting ratio of a factor of three. The only way the traditional wheelbarrow could achieve this improvement is by having a handle length B three times longer than the payload placement length A, whereas this can be achieved through the angular relationship between the first lever and the second lever as shown in FIG. 2C.

Figure 3A:
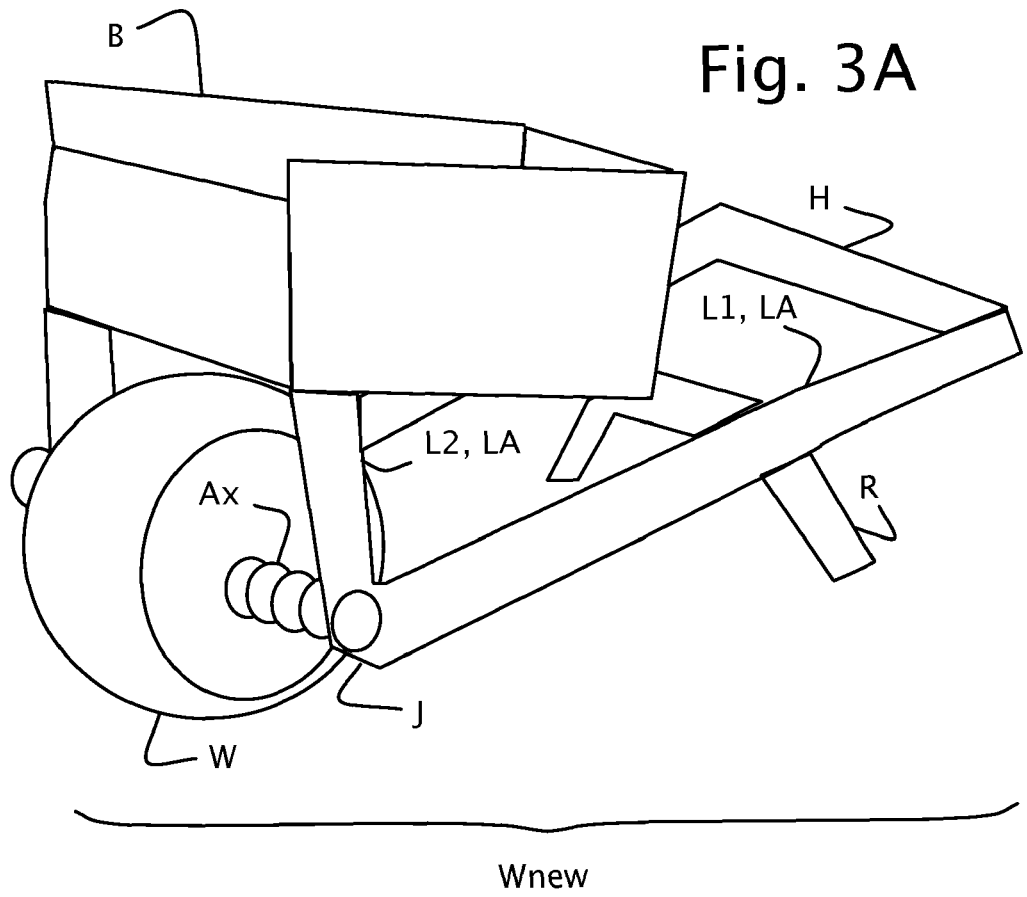
Figure 3B:
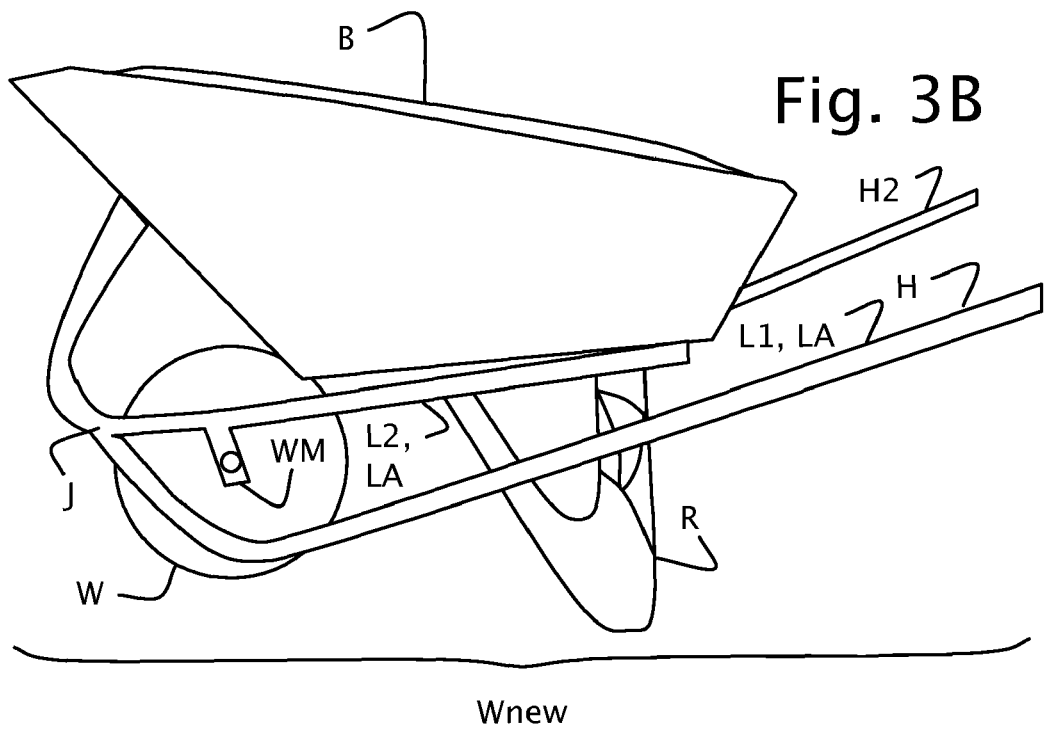

The first lever L1 may further provide a second handle H2 as shown in FIG. 3B.

Certain preferred embodiments of the wheel barrow Wnew use a lever assembly LA including the first lever L1 for providing at least one handle H and rigidly coupled to the second lever L2 for providing a bucket B for a payload. When constructed this way, the wheelbarrow includes the lever assembly to provide at least one handle and the bucket and the lever assembly mounted one at least one wheel W. The first lever further provides at least one handle, and the second lever further provides the bucket.

Figure 5A:
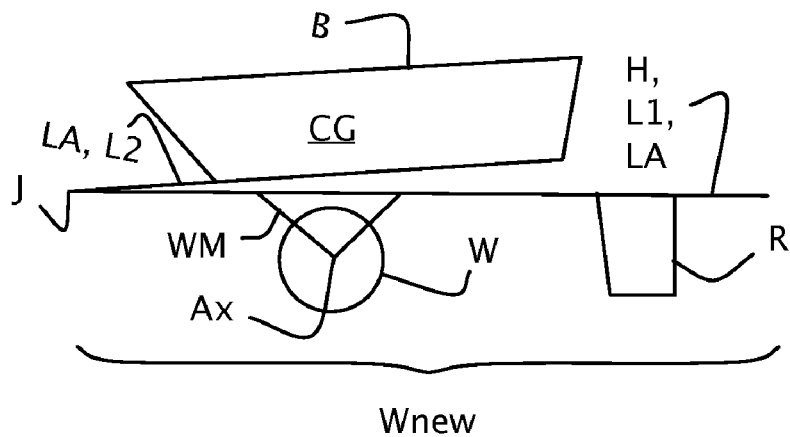
FIG. 5A shows a preferred embodiment of the invention's wheelbarrow positioning the wheel below the center of gravity of the bucket when uniformly filled with a payload.
Figure 5B:
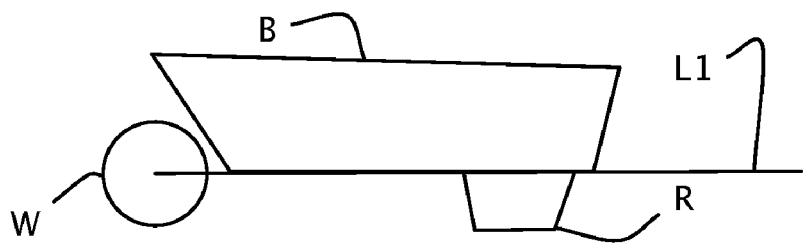
FIG. 5B shows a prior art wheelbarrow.
Figure 5C:
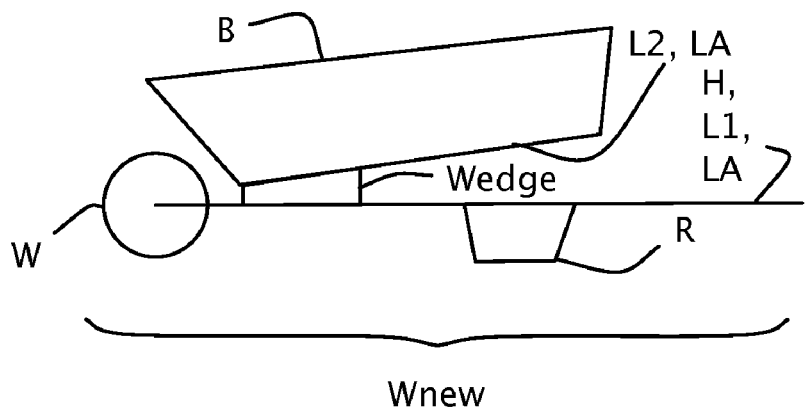
FIG. 5C illustrates a method of creating the invention's wheelbarrow through the introduction of a wedge.

The invention's wheelbarrow Wnew may further be preferred to mount the wheel W essentially over the center of gravity CG of the bucket B when filled with uniform payload, as shown in FIG. 5A.

The lever assembly LA may further be mounted on at least two wheels, W and W2 as shown in FIGS. 4A and 4B.

The wheel W may be mounted to the first lever L1, the second lever L2 and/or a joint J coupled between the first lever and the second lever. By way of example, FIGS. 1B, 1C, 3B and 5A show the wheel mounted via a wheel mount WM to the first lever. FIG. 2B shows the wheel mounted via the wheel mount to the second lever. FIGS. 1D, 2A, 2C, 3A and 4D show the wheel mounted at the joint.

Manufacturing the wheelbarrow Wnew may include coupling the lever assembly to the bucket to create the second lever L2 providing the bucket B, and mounting the lever assembly to the wheel W to create the lever assembly mounted to the wheel. Manufacturing the wheelbarrow may further include coupling the first lever to the second lever assembly, coupling the bucket to the second lever, and mounting the at least one wheel to the lever assembly to create the wheelbarrow.

The bucket B may vary in shape, size of walls, number of walls and materials the bucket is made from. The wheel barrow may be made from wood, metal, and/or plastics, which may include rubber compounds.

The preceding embodiments provide examples of the invention and are not meant to constrain the scope of the following claims.

What is claimed is:

1. A dual lever wheelbarrow, comprising:
   two lever assemblies, each lever assembly, comprising:
      a first lever defining a handle, said first lever having a distal end and a proximate end;
      a second lever supporting a payload fixedly attached thereto, said second lever having a distal end and a proximate end; wherein the distal end of said second lever is rigidly joined to the distal end of said first lever, and wherein said first and second levers are disposed in an adjacent and substantially parallel configuration;
   a rest; and
   at least one wheel mounted to said lever assemblies, wherein said at least one wheel is mounted at the center of gravity of the payload supported by said second lever.

2. The wheelbarrow of claim 1, wherein said at least one wheel is mounted to said lever assemblies by means of a wheel mount coupling.

3. The lever assembly of claim 1, further including a wedge disposed between said first and said second lever.

* * * * *